Dec. 20, 1938.     C. CONE     2,140,785

FIRING APPARATUS FOR FURNACES

Filed Oct. 30, 1935     2 Sheets-Sheet 1

INVENTOR
C. Cone
BY Charles A. Lind
ATTORNEY

Dec. 20, 1938.                C. CONE                    2,140,785
                   FIRING APPARATUS FOR FURNACES
                      Filed Oct. 30, 1935         2 Sheets-Sheet 2
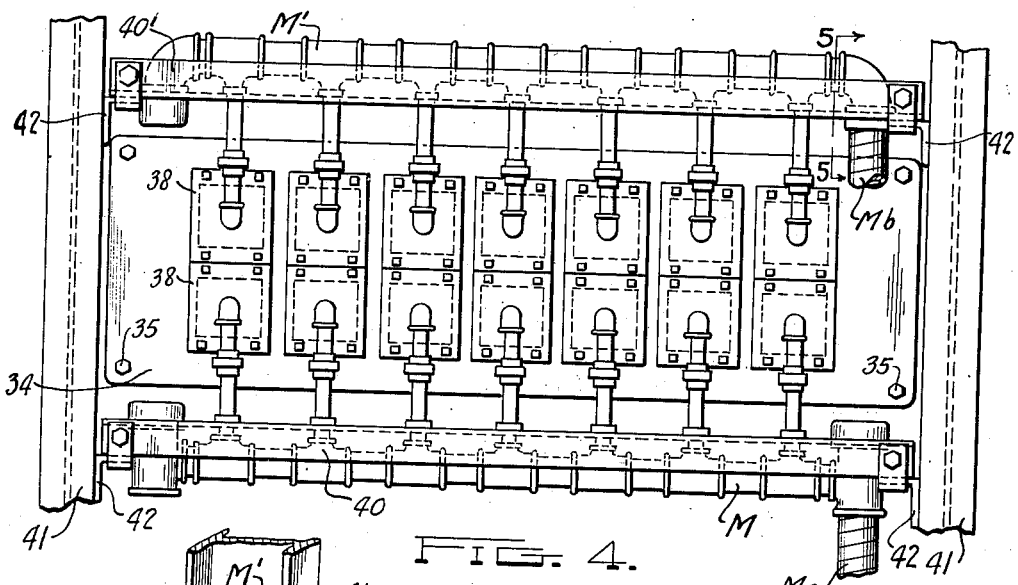
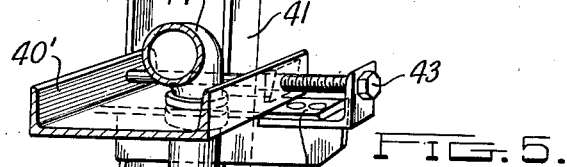
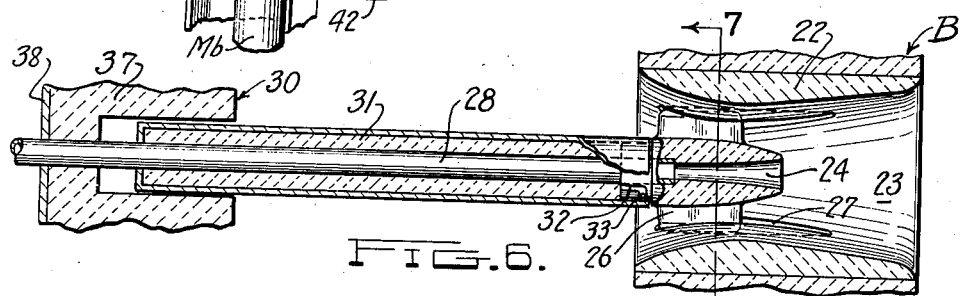
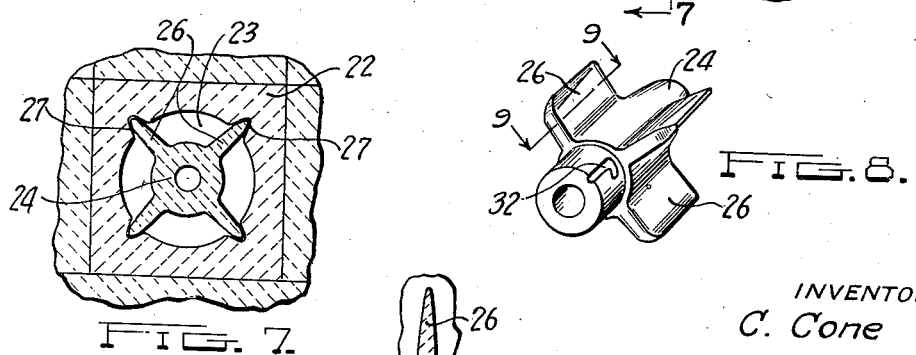
INVENTOR
C. Cone
BY Charles A. Lind
ATTORNEY Patented Dec. 20, 1938

2,140,785

UNITED STATES PATENT OFFICE 2,140,785

FIRING APPARATUS FOR FURNACES

Carroll Cone, near Toledo, Ohio, assignor to Surface Combustion Corporation, Toledo, Ohio, a corporation of New York Application October 30, 1935, Serial No. 47,502

1 Claim. (Cl. 158—7)

The present invention aims to provide improvements in ways and means for introducing fuel gas and combustion-supporting air into a furnace chamber in a manner to obtain a relatively long flame therein.

As disclosed in patent to Burke 1,900,223 dated March 7, 1933, it is possible to obtain a relatively long flame in a furnace chamber by causing separate streams of air and gas to flow in the same direction in parallel contacting relation at substantially the same velocity. However, with the duct apparatus of the type disclosed in Burke reliance must be placed wholly on pressure regulating apparatus for insuring that the air and fuel gas delivered to the ducts shall be at such nearly equal pressures as will cause the air and gas to flow from the ducts at substantially the same velocity.

In accordance with the present invention the air and fuel gas are delivered to the furnace chamber by means including an air passage of Venturi type and a fuel discharge nozzle adjustably positioned in said passage whereby the point of emergence of the fuel from the nozzle may be varied to suit the prevailing pressures of the air and gas and thus to compensate for such relative changes in air and gas pressures as would tend to creat turbulence between the air and gas streams.

For a more complete understanding of the invention reference is made to the detail description taken in connection with the accompanying drawings wherein the preferred form of the apparatus is shown.

In the accompanying drawings,—

Fig. 4 is an outside end elevation of the firing end of the furnace, the view being on a larger scale than Fig. 1;

Fig. 5 is a detail view taken on line 5—5 of Fig. 4;

Fig. 6 is an enlarged detail view of parts shown in Fig. 3;

Fig. 7 is a cross sectional view on line 7—7 of Fig. 6;

Fig. 8 is a perspective view of one of the elements shown in Fig. 6, and

Fig. 9 is a cross section on line 9—9 of Fig. 8.

Figure 1:
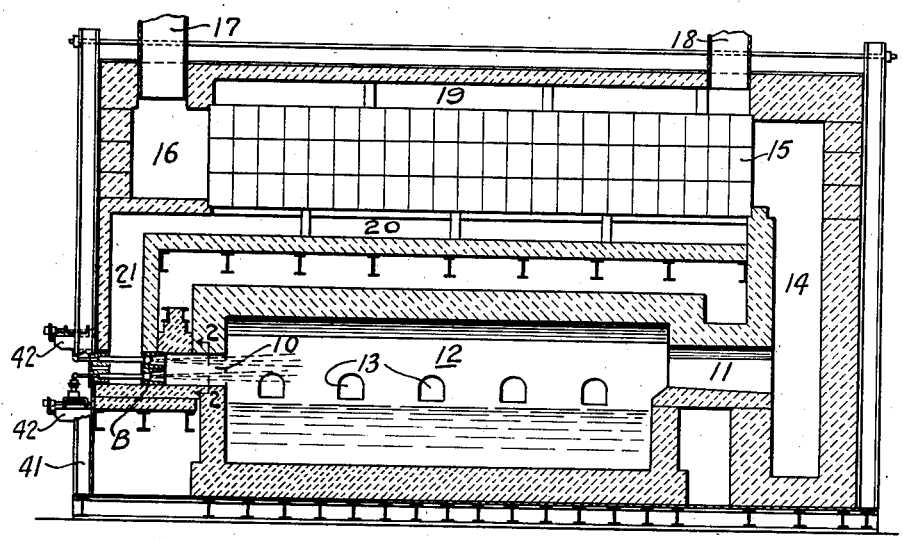
Fig. 1 shows the present invention applied to a glass melting furnace, the view being a vertical longitudinal section of the furnace.
Figure 2:
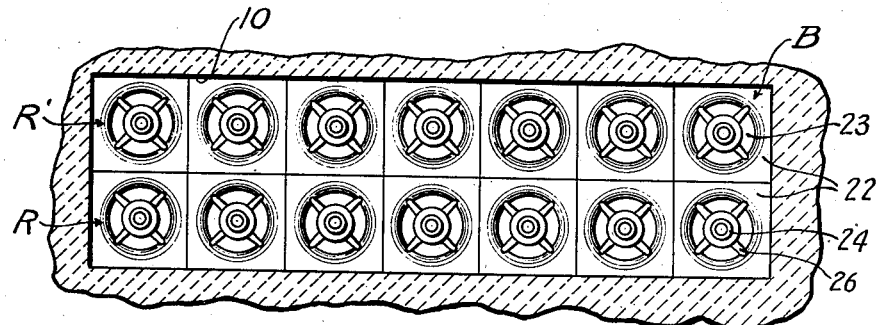
Fig. 2 is an inside end elevation of the firing end of the firing chamber of the furnace, the view being taken on line 2—2 of Fig. 1 and being on a larger scale than the latter.

In the drawings, 10 indicates a firing port and 11 an exhaust port of a firing chamber 12 which, in the present instance, is a glass tank to which access is had by the usual side holes 13. The exhaust port 11 discharges into an upright flue 14 which delivers to a tile recuperator 15 similar to that shown in patent to Stein 1,404,721 dated January 24, 1922. The gases on passing through the recuperator enter a chamber 16 from which they flow to stack 17. The recuperator serves to preheat the air for combustion, the air being supplied under pressure to a pipe 18 which discharges into a distributing duct 19 which is in communication with vertical air passages in the recuperator. The air on passing through the recuperator enters a horizontal duct 20 which communicates with a downcomer duct 21 which in turn communicates with the firing port 10 through a multi-apertured wall generally indicated at B.

The wall B comprises a plurality of tile blocks 22 each provided with a Venturi passage 23 for reasons hereinafter stated. In each passage 23 is a gas discharge nozzle 24 having a bore of gradually increasing diameter toward its discharge end. Each nozzle 24 is provided with a plurality of longitudinally extending radial vanes 26 of stream-line shape which serve the double purpose of centering the nozzle in the passage 23 and of causing the air flowing through the latter to flow straight forwardly with minimum turbulence. The nozzle is prevented from turning in the passage 23 by making the vanes 26 of sufficient radial length to extend into guide grooves 27 in the wall of said passage, the vanes where they enter the grooves being beveled. Each nozzle is made of refractory tile and is so mounted in the passage as to be adjustable axially thereof.

Each nozzle is supplied with fuel gas under pressure by a tube 28 which, at its discharge end, projects a short distance into the bore of the nozzle (see Fig. 6) and which extends across the air supply duct 21 and through a removable section 30 of the side wall of the duct. That portion of the tube 28 which extends across the air duct 21 is covered by a heat-insulating jacket 31 whereby to keep the tube cool enough to prevent the fuel gas flowing therethrough from being thermally decomposed with liberation of carbon which would tend to clog the tube.

Each nozzle 24 is detachably mounted on the tube 28 by a locking device comprising an L-shape groove 32 on the hub of the nozzle and a groove-entering pin 33 carried by the insulating jacket 31, as will be readily understood by reference to Figs. 6 and 8.

Figure 3:
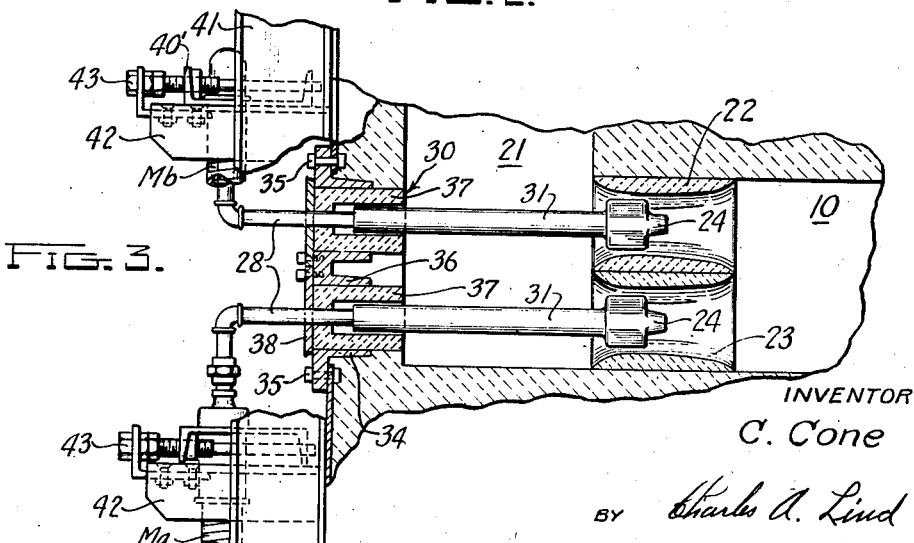
Fig. 3 is an enlarged detail view of parts shown in Fig. 1.

The side wall section 30 of the duct 21 comprises a metal frame 34 (see Figs. 3 and 4) which is held in place by bolts 35 which extend through a flange thereof. Extending between the sides of the frame is a cross bar 36. The opening through the frame is normally closed by a plurality of apertured blocks 37, there being a block for each gas tube 28, the blocks being individually removable from the frame 34 to facilitate replacement of individual burner nozzles 24 if circumstances should so require. In case a block 22 of the firing port wall B requires to be replaced, the frame 34 is removed to permit access thereto. Plates 38 individual to the frame blocks 37 may be removably secured to the frame 34 for holding its blocks in place.

Two rows R and R' of tile blocks 22 are shown; however, the number of rows employed and the number of blocks in each row will obviously depend on the size of the furnace, etc., as will be readily understood by those skilled in the art. Each of the gas tubes 28 in the lower row, penetrating the side-wall section 30 and the plate 38, connects with a horizontally disposed gas conduit M fixedly supported on a cross beam 40 and each of the tubes in the upper row similarly connects with another conduit M' fixedly supported on a similar cross beam 40'. The gas tubes with their insulating jackets fit snugly within but are longitudinally adjustable in their mounting in wall section 30 and plates 38. The cross beams extend between upright supporting columns 41 on which are shelves 42 whereon the ends of the individual beams are adjustably supported, there being a pair of adjusting screws 43 for each beam. It will, therefore, be readily appreciated that each row of gas nozzles 24 may be adjusted independently of the other row and that all of the gas nozzles in any one row are simultaneously adjustable. Flexible gas supply conduits Ma and Mb connect with the conduits M and M', respectively.

As is well known the velocity of a fluid flowing through a Venturi passage will gradually increase as it flows from the mouth to the throat of the passage, the maximum velocity being in the throat, and will gradually decrease as it flows from the throat and through the expansion cone of the passage. It will, therefore, be seen that the present invention takes advantage of these flow characteristics in the following way. Suppose that the gas were discharged from the gas nozzle 24 at a point within the mouth or entrance cone of the Venturi passage 23 instead of at a point within the expansion cone as shown in Fig. 6: in such event the entraining effect of the air as it approaches the throat would cause such effective intermixing of the air and gas that the rate of flame propagation through the mixture would be so rapid as to produce a typical, short and blue, premix flame. If on the other hand, as is contemplated by the present invention, the gas is discharged at a point within the expansion cone and more particularly at the point where the velocities of the respective air and gas streams are substantially equal, there will be very little intermixing of the two streams by the time they leave the expansion cone and such intermixing as does take place will be due primarily to interdiffusion. In other words, the air on leaving the Venturi passage will contain a core of gas the integrity of which tends to persist except as interdiffusion tends to produce a mixture of the two streams. As a consequence of introducing the air and gas into the firing chamber in this manner combustion is prolonged and the resulting flame is highly luminous.

By providing for the adjustment of the gas nozzles in their respective air passages it will be readily appreciated that variations in air and gas supply pressures may be readily compensated for, and the two components of the combustible mixture be caused to meet while advancing at equal rates of flow—a condition to be empirically determined and maintained, in response to observation upon the flame.

The present invention has special utility with glass tanks for reasons pointed out in patent to De Coriolis et al., 1,900,432, dated March 7, 1933.

What I claim is:

Apparatus for delivering a stream of fuel and an enveloping stream of air to a combustion chamber comprising, in combination, a Venturi-shape firing port through which air flows from a source of supply at the mouth of the port whereby in flowing through the port its velocity first increases and then decreases, and means within said port for supplying fuel to the middle of the air stream at a point where its velocity is decreasing whereby intermixing of the air and fuel is retarded, said means comprising an axially adjustable fuel-discharge nozzle whose normal position is inwardly of the throat of said port.

CARROLL CONE.